United States Patent
Cho et al.

(10) Patent No.: US 7,613,611 B2
(45) Date of Patent: Nov. 3, 2009

(54) METHOD AND APPARATUS FOR VOCAL-CORD SIGNAL RECOGNITION

(75) Inventors: Kwan Hyun Cho, Daejeon (KR); Mun Sung Han, Daejeon (KR); Young Giu Jung, Busan (KR); Hee Sook Shin, Daejeon (KR); Jun Seok Park, Daejeon (KR); Dong Won Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 952 days.

(21) Appl. No.: 11/140,105

(22) Filed: May 26, 2005

(65) Prior Publication Data

US 2006/0095260 A1 May 4, 2006

(30) Foreign Application Priority Data

Nov. 4, 2004 (KR) ............... 10-2004-0089168

(51) Int. Cl.
*G10L 13/02* (2006.01)
(52) U.S. Cl. ............... 704/261; 704/207; 704/226; 704/228; 704/224
(58) Field of Classification Search ........... 704/205, 704/207, 215, 226–228, 219, 225, 224, 261
See application file for complete search history.

(56) References Cited

U.S. PATENT DOCUMENTS

| | | | | |
|---|---|---|---|---|
| 4,827,516 A | * | 5/1989 | Tsukahara et al. | 704/224 |
| 5,175,793 A | * | 12/1992 | Sakamoto et al. | 704/200 |
| 5,418,405 A | * | 5/1995 | Takasaki | 307/147 |
| 5,794,185 A | * | 8/1998 | Bergstrom et al. | 704/223 |
| 5,924,061 A | * | 7/1999 | Shoham | 704/218 |
| 6,243,505 B1 | * | 6/2001 | Bosso et al. | 385/2 |
| 6,456,964 B2 | * | 9/2002 | Manjunath et al. | 704/205 |
| 6,480,825 B1 | * | 11/2002 | Sharma et al. | 704/270 |
| 6,675,140 B1 | * | 1/2004 | Irino et al. | 704/203 |
| 6,691,082 B1 | * | 2/2004 | Aguilar et al. | 704/219 |
| 6,782,405 B1 | * | 8/2004 | Matula et al. | 708/504 |
| 6,829,578 B1 | * | 12/2004 | Huang et al. | 704/211 |
| 2004/0002856 A1 | * | 1/2004 | Bhaskar et al. | 704/219 |

FOREIGN PATENT DOCUMENTS

| | | |
|---|---|---|
| JP | 08-275279 | 10/1996 |
| KR | 0176751 | 11/1998 |
| KR | 1020000025292 | 5/2000 |
| KR | 2000-0073638 | 12/2000 |
| KR | 1020030010432 | 2/2003 |
| KR | 1020030014973 | 2/2003 |

OTHER PUBLICATIONS

"Study on Speech Recognition for Neck-Microphone Input Signal", Y. Lee, et al., Human Medical Tech. Inc., ETRI, Nov. 2002, pp. 747-750, w/translation, Abstract.

* cited by examiner

*Primary Examiner*—Vijay B Chawan
(74) *Attorney, Agent, or Firm*—Blakely, Sokoloff, Taylor & Zafman LLP

(57) ABSTRACT

Provided is a method and an apparatus for vocal-cord signal recognition. A signal processing unit receives and digitalizes a vocal cord signal, and a noise removing unit which channel noise included in the vocal cord signal. A feature extracting unit extracts a feature vector from the vocal cord signal, which has the channel noise removed therefrom, and a recognizing unit calculates a similarity between the vocal cord signal and the learned model parameter. Consequently, the apparatus is robust in a noisy environment.

8 Claims, 5 Drawing Sheets

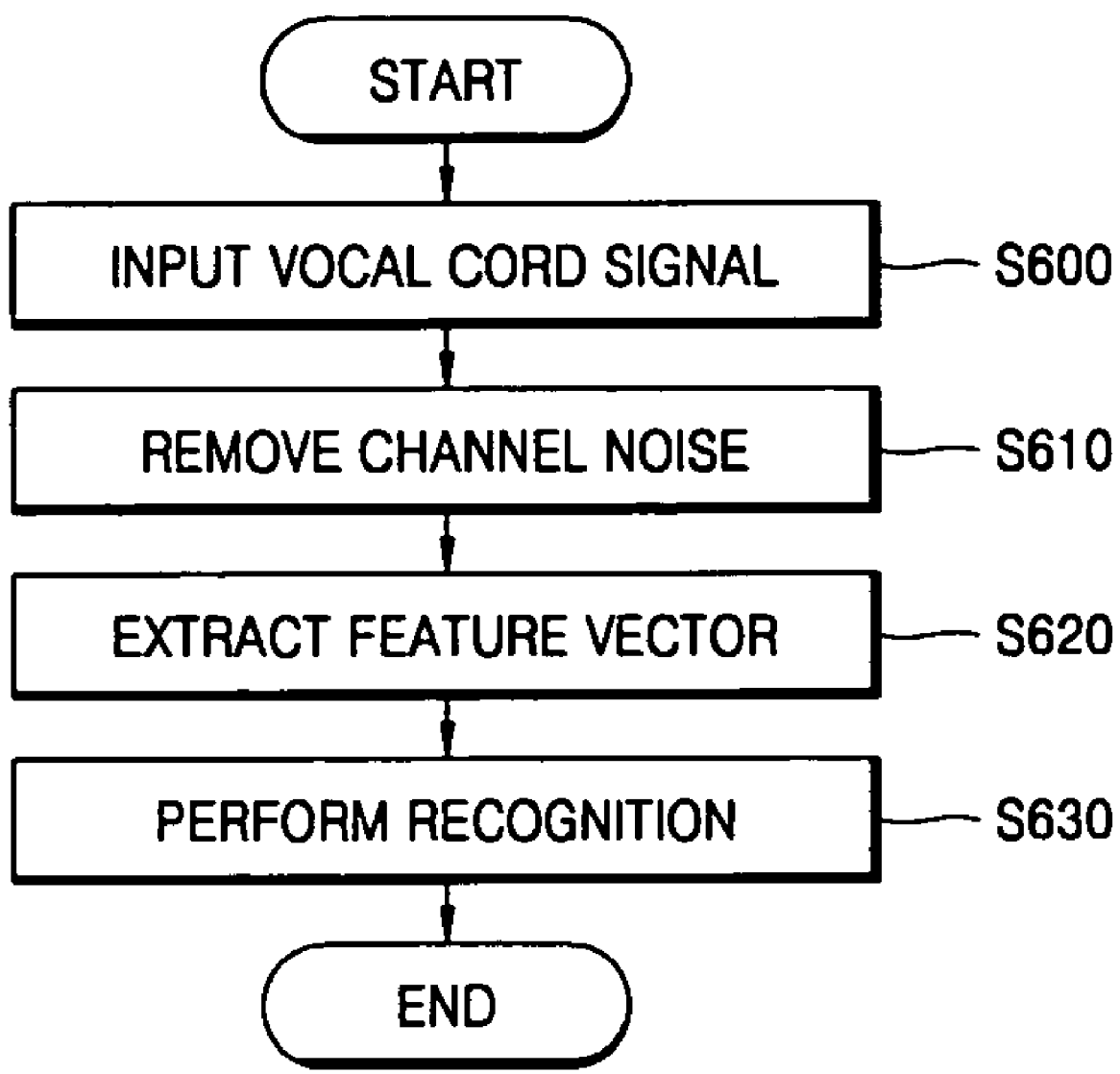

METHOD AND APPARATUS FOR VOCAL-CORD SIGNAL RECOGNITION

This application claims the priority of Korean Patent Application No. 10-2004-0089168, filed on Nov. 4, 2004 in the Korean Intellectual Property Office, the disclosure of which is incorporated herein in its entirety by reference.

BACKGROUND OF THE INVENTION

1. Field of the Invention

The present invention relates to a method and apparatus for vocal-cord signal recognition with a high recognition rate in a noisy environment.

2. Description of the Related Art

FIG. 1 is a block diagram of a conventional apparatus for speech recognition. Referring to FIG. 1, the conventional apparatus for speech recognition includes a feature extracting unit 100 and a speech recognizing unit 110. The feature extracting unit 100 extracts particular features appropriate for speech recognition from an audio signal input from a microphone. However, the extraction of the particular features depends highly on the performance of the apparatus for speech recognition. Particularly, since the extraction of the particular features is degraded as the noise in the environment increases, various methods are used to extract particular features that are noise-robust.

Examples of a method of distance scale that is robust to additive noise includes a short-time modified coherence (SMC) method, a relative spectral (RASTA) method, a perpetual linear prediction (PLP) method, a dynamic features parameter method, and a cepstrum scale method. Examples of a method of removing noise are a spectral subtraction method, Bayesian estimation method, and a blind source separation method.

As a prior art of the apparatus for speech recognition, Korean Patent Publication No. 2003-0010432 discloses an "Apparatus for speech recognition in a noisy environment" which uses a blind source separation method. Noise included in two audio signals input to two microphones is separated using a learning algorithm that uses an independent component analysis (ICA). As a result, speech recognition rate is improved by the improved audio signals. However, the learning method using the ICA cannot be adopted in an apparatus for real-time speech recognition because the calculation of the learning algorithm is complex.

A Mel-frequency cepstral coefficient (MFCC), a linear prediction coefficient cepstrum, or a perceptual linear prediction cepstrum coefficient (PLPCC) are widely used as a method of extracting features of a signal after going through a pre-processing that removes noise or improves quality of the sound.

The speech recognizing unit 110 measures similarity between the vocal cord signal and the audio signal using the particular features extracted by the feature extracting unit 100 to calculate the result of speech recognition. To do this, hidden Markov model (HMM), a dynamic time warping (DTW), and a neural network are popularly used.

SUMMARY OF THE INVENTION

The present invention provides a method and an apparatus for vocal-cord signal recognition that can resolve degradation of speech recognition efficiency due to noise and is applicable in real-time in an environment where resource is limited, such as a small-sized mobile device, using a wireless channel.

According to an aspect of the present invention, there is provided an apparatus for vocal-cord signal recognition, including: a signal processing unit which receives a vocal cord signal and digitalizes the vocal cord signal; a noise removing unit which removes channel noise included in the vocal cord signal; a feature extracting unit which extracts a feature vector from the vocal cord signal, which has the channel noise removed therefrom; and a recognizing unit which calculates a similarity between the vocal cord signal and the learned model parameter.

According to another aspect of the present invention, there is provided a method of vocal-cord signal recognition. The method includes: receives a vocal cord signal through a neck microphone; removing channel noise included in the vocal cord signal; extracting a feature vector from the vocal cord signal, which has the channel noise removed therefrom and recognizing speech by calculating similarity between the vocal cord signal and the learned model parameter.

As a result, the apparatus for vocal-cord signal recognition that is noise-robust is configured.

BRIEF DESCRIPTION OF THE DRAWINGS

The above and other features and advantages of the present invention will become more apparent by describing in detail exemplary embodiments thereof with reference to the attached drawings in which:

FIG. 6 is a flow chart illustrating a method of vocal-cord signal recognition according to an embodiment of the present invention.

DETAILED DESCRIPTION OF THE INVENTION

The present invention uses a method of speech recognition using a vocal cord signal instead of a voice signal that was usually used in the conventional methods. The vocal cord signal reduces accuracy of a signal compared to the voice signal because it does not effectively reflect resonance, which is produced by passing through a vocal cord, when in a quiet environment. However, because the vocal cord signal is hardly affected by surrounding noise, the vocal cord signal can replace the voice signal in a noisy environment.

The present invention will now be described more fully with reference to the accompanying drawings, in which exemplary embodiments of the invention are shown.

Figure 1:
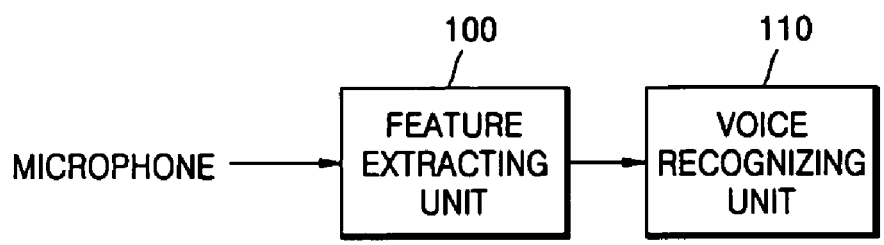
FIG. 1 is a block diagram of a conventional apparatus for speech recognition.
Figure 2:
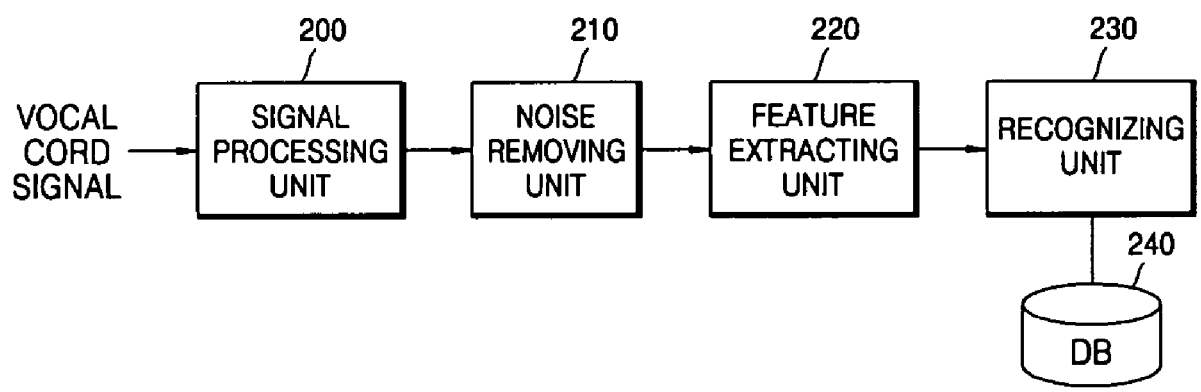
FIG. 2 is a block diagram of an apparatus for vocal-cord signal recognition according to an embodiment of the present invention.

FIG. 2 is a block diagram of an apparatus for vocal-cord signal recognition according to an embodiment of the present invention.

Referring to FIG. 2, the apparatus for vocal-cord signal recognition includes a signal processing unit 200, a noise removing unit 210, a feature extracting unit 220, a recognizing unit 230, and a database 240.

The signal processing unit 200 receives a vocal cord signal. The signal processing unit 200 uses a neck microphone to obtain a vibrating signal of a vocal cord as a vocal cord microphone to obtain the vocal cord signal. In addition, the signal processing unit 220 converts the form of the obtained vocal cord signal into a form transmittable in a wireless interface, such as Bluetooth.

The noise removing unit 210 removes channel noise included in the vocal cord signal. The commonly used cepstral mean normalization (CMN) removes noise by calculating the average cepstrum of the signal sections and then subtracting it from each of the frames. This method shows relatively good results, but has a disadvantage that a lot of information in the signal section that is not noise is removed because information of frames with major information of the vocal section is included in the process of calculating the average cepstrum. The vocal cord signal used in the present embodiment of the present invention is hardly affected by the surrounding noise when obtaining the vocal cord signal. Thus, the method of removing only the channel noise of the vocal cord microphone can be expressed as the following Equation:

$$\widehat{X}_t = X_t - N_t, N_t = \frac{1}{T}\sum_{t=0}^{T-1} N_t \tag{1}$$

Vocal cord signal $\hat{X}_t$ with the channel noise removed is calculated by subtracting $N_t$ from vocal cord signal $X_t$. $N_t$ is the average noise cepstrum of mute sections calculated by "T" mute frames that are initialize for the first time, and is the channel noise included in the vocal cord signal. The local moving average noise cepstrum is calculated by applying the noise frame obtained afterwards.

The local moving average noise cepstrum is calculated through Equation below to adopt the channel noise by applying the information of the recently obtained noise frame $N_c$.

$$\hat{X}_t = X_t - N_{new}, N_{new} = \alpha \times N_{old} + (1-\alpha) \times N_c \tag{2}$$

wherein α is applied in proportion to the size of a butter used in the analysis of the average noise information.

In addition, the noise removing unit 210 may use a spectral subtraction method, a relative spectral (RASTA) method, or a cepstrum normalization as the method for removing channel noise.

The feature extracting unit 220 detects a signal section from the vocal cord signal in which channel noise is removed, and extracts a feature vector.

First, in detecting of the signal section, an end point detection of the vocal cord signal by signal magnitude is not effective because the clarity or magnitude of the vocal cord signal is usually less than that of an audio signal obtained via a microphone. Therefore, the feature extracting unit 220 uses two values which represent values of the signal and noise for the end point detection. Relatively recently obtained values are used as values representing the signal, and relatively previously obtained values are used as values representing the noise.

$$S_t = \frac{1}{N_1}\sum_{i=t-N_1}^{t} X_i, N_t = \frac{1}{N_2}\sum_{i=t-N_1-N_2}^{t-N_1} X_i \tag{3}$$

wherein $X_i$ is the spectrum distribution when t=i.

$S_t$ is the average distribution value of the signal regarding recent $N_1$ frames, and $N_t$ is the average distribution value of $N_2$ noise afterwards.

Three values are used as the threshold to determine the starting point of the vocal cord signal and the ending point of the vocal cord. The three values are base threshold, relative threshold, and noise duration.

The base threshold is the minimum limit value of the signal. A frame with lower threshold than the base threshold is determined to be a frame in which voice is not heard. The relative threshold is a value for comparing the relative difference between $S_t$ and $N_t$, and is used for determining the starting point of the signal together with the base threshold. The noise duration is a value to determine the ending point of the voice, and indicates how long mute terms will be allowed to distinguish the boundary of the voice of the user.

The condition for determining the starting point of the vocal cord signal is expressed in Equation 4, and the condition for determining the ending point of the vocal cord signal is expressed in Equation 5.

$$StartDetect = \begin{cases} 1, & \text{if}(S_t \geq BaseThreshold) \text{ and } (\text{abs}(S_t - N_t) \geq RelativeThreshold) \\ 0, & \text{else} \end{cases} \tag{4}$$

$$EndDetect = \begin{cases} 1, & \text{if}(S_t \leq BaseThreshold) \text{ and } (ContinuousNoiseFrames \geq NoiseDuration) \\ 0, & \text{else} \end{cases} \tag{5}$$

FIGS. 3A, 3B, 3C, and 3D are views of the results of an end point detection of a vocal cord signal.

Figure 3A:
FIGS. 3A, 3B, 3C and 3D are views of the results of an end point detection of a vocal cord signal.
Figure 3B:
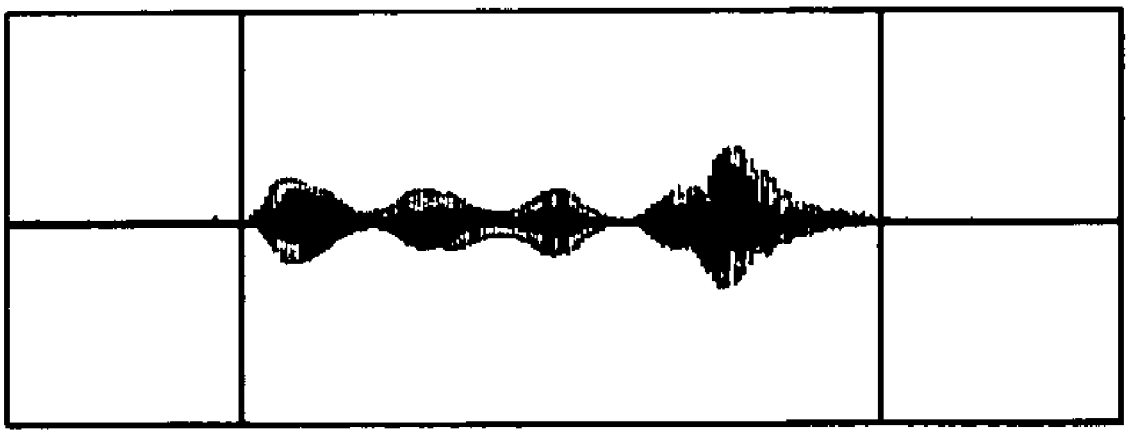
Figure 3C:
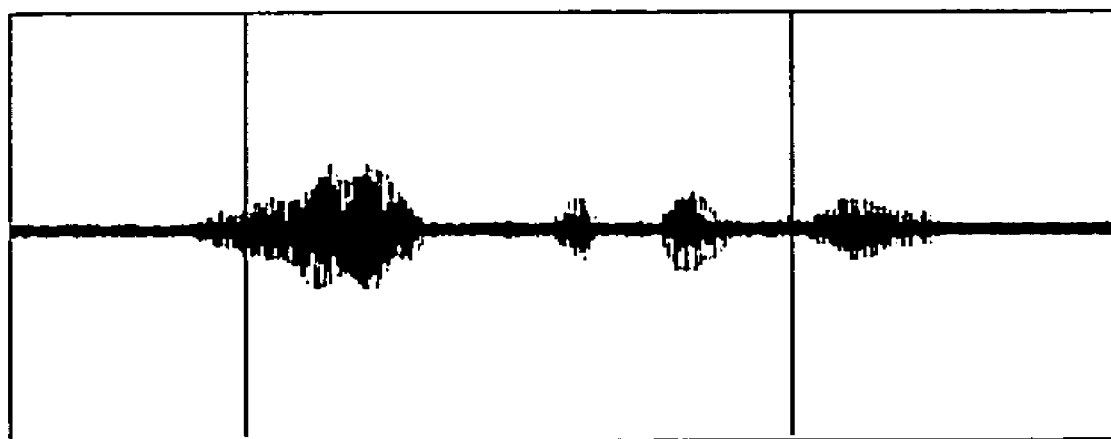
Figure 3D:
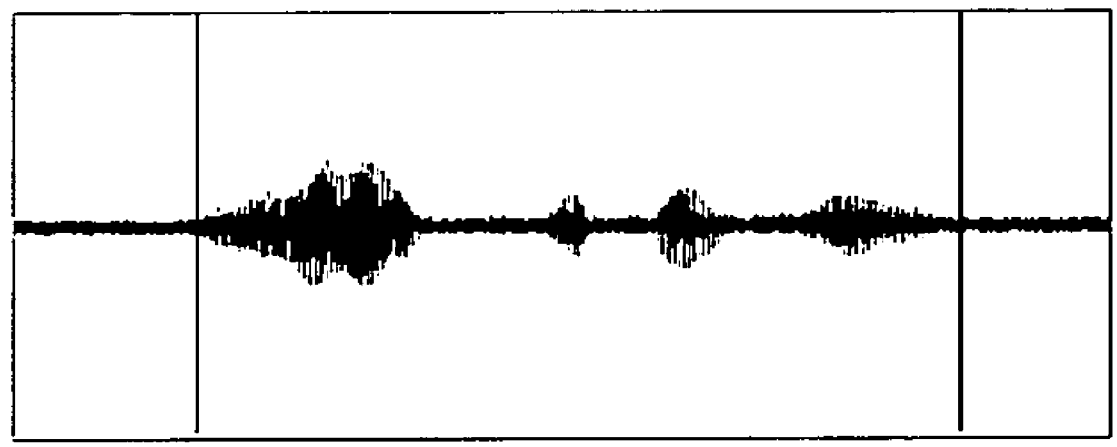

FIGS. 3A and 3C illustrate the results according to the method using magnitude of energy and zero crossing rate in a time domain, and FIGS. 3B and 3D illustrate the results according to the method of the present embodiment of the present invention.

Referring to FIGS. 3A and 3B, there is little difference when there is relatively little amount of noise and the magnitude of the signal is large. However, when the magnitude of the signal is relatively small or there is much noise, there is a difference in the accuracy of the end point detection as illustrated in FIGS. 3C and 3D.

Next, in extracting of the feature vector, the feature extracting unit 220 can use, for example, a Mel-frequency cepstral coefficient (MFCC) or a linear prediction coefficient (LPC) cepstrum as the method of extracting the feature vector.

The feature extracting unit 220 is used in the process of extracting the feature vector by possibly automatically calculating recourses to extract the feature vector that can guarantee real-time response time especially in an environment with limited resources, such as in a miniature portable terminal, and can possibly maximize the accuracy of the vocal-cord signal recognition.

Data used in the extraction of the feature vector is usually in a floating point form. However, hardware of a miniaturized system such as that of the portable terminal does not generally support floating point calculation unit, and thus requires more amount of calculations than when using the floating point calculation. As a result, cases when real-time response time cannot be guaranteed occur.

Floating point data is converted into fixed point data using, for example, Q-format method. In this process, the accuracy of the data increases as more number of bits is used for expressing a decimal point, but the amount of calculation increases. Therefore, possibly the resources are calculated by periodically operating a module corresponding to the amount of feature extraction calculations of a single frame, and using the calculated resources, the number of bits for expressing a decimal point is maximized within a range which guarantees real-time response time in the present embodiment of the present invention.

In case of log and square root which require more amount of time when extracting the feature, the method of real-time processing can be configured by expressing an input number as $2^n$ and then approximating the rest of the values using the table. Equation 6 is for calculating log and square root, and Equation 7 is for calculating approximate values and index of the table.

$$\log(x) = N \times \log(2) + \log\left(\frac{x}{2^N}\right) \quad (6)$$

$$sqrt(x) = 2^{2N} \times sqrt\left(\frac{x}{(2^{2N})^2}\right)$$

Here, N of log(x) is the integer to satisfy, "$2^N \leq x < 2^{N+1}$" and

N of sqrt(x) is the integer to satisfy, "$2^{2N} \leq x < 2^{2N+1}$".

$$\text{Range of log table: } 0 \leq \frac{x}{2^x} < 2 \quad (7)$$

$$\text{Log index: index} = (int)\left(\frac{x}{2^N} - 1\right) \times ArraySize$$

$$\text{Range of square root table: } 0 \leq \frac{x}{(2^{2N})^2} < 4$$

$$\text{Square root index: index} = (int)\left(\frac{x}{(2^{2N})^2}\right) \times \left(\frac{ArraySize}{4}\right)$$

For example, when using MFCC, the feature extracting unit 220 performs a pre-emphasis which reduces the dynamic range of the vocal cord signal by smoothing a spectrum tilt. In more detail, the feature extracting unit 220 composes one frame with about 10 msec data, multiplies a window (i.e., Hamming window) to prevent distortion of frequency information caused by a sudden change in a threshold value between frames, calculates Fourier transform to obtain frequency information of the signal within the frame, filters frequency amplitude with around 20 mel-scaled filter banks, and then changes the simplified spectrum into log domain using logarithm functions, and extracts MFCC by inverse Fourier transform.

The recognizing unit 230 calculates similarity between the vocal cord signal extracted at the feature extraction unit 220 and the learned model parameter 240. The recognizing unit 230 uses, for example, a hidden Markov model, a dynamic time warping (DTW), or a neural network (NN) for modeling.

Parameters of the model used at the recognizing unit 230 are stored in the learned database 240. When the recognizing unit 230 uses the NN model, parameters stored in the database 240 are weight values of each node learned by a back propagation (BP) algorithm, and if the recognizing unit 230 uses the HMM, parameters stored in the database 240 are probability of state transition and probability distribution of each state learned through a Baum-Welch re-estimation method.

Figure 4:
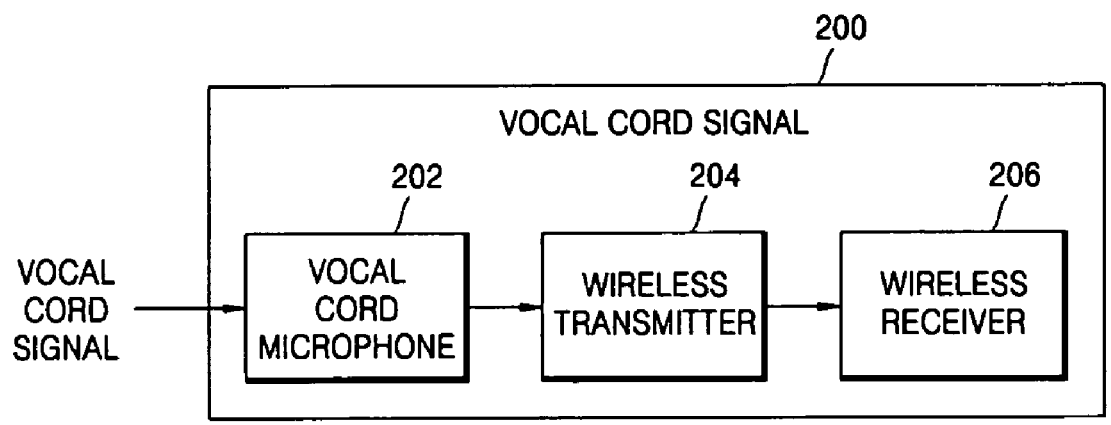
FIG. 4 is a block diagram of a signal processing unit illustrated in FIG. 2.

FIG. 4 is a block diagram of the signal processing unit 200 illustrated in FIG. 2.

Referring to FIG. 4, the signal processing unit 200 includes a vocal cord microphone 202, a wireless transmitter 204, and a wireless receiver 206. The vocal cord microphone 202, which is generally a neck microphone, receives a vocal cord signal. The wireless transmitter 204 transmits the vocal cord signal to the wireless receiver 206 via a wireless personal area network (WPAN), can controls an amplifier (not showon) using gain control information fed back from the wireless receiver 206. The gain control information transmitted from the wireless receiver 206 to the wireless transmitter 204 is for readjusting the gain appropriate for the end point detection of the vocal cord signal, and is calculated using a base threshold used in the end point detection.

When using the signal processing unit 200 illustrated in FIG. 4, the vocal cord microphone 202, which receives the vocal cord signal, and an interface device, which recognizes speech by processing the vocal cord signal through a predetermined process, can be used separately.

Figure 5:
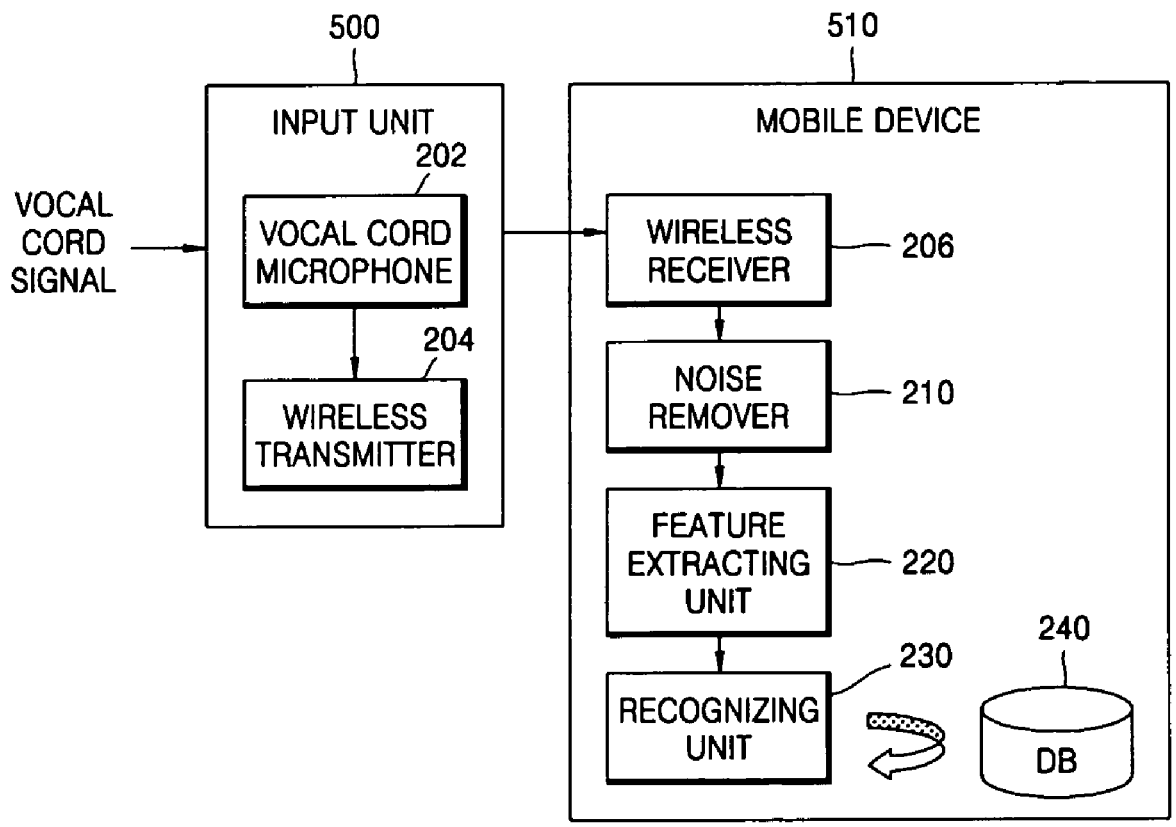
FIG. 5 is a block diagram of an apparatus for vocal-cord signal recognition that is adopted in a small-sized portable device according to an embodiment of the present invention.

FIG. 5 is a block diagram of an apparatus for vocal-cord signal recognition that is adopted in a small-sized portable device according to an embodiment of the present invention.

Referring to FIG. 5, an input unit 500, which receives a vocal cord signal, and mobile device 510, which recognizes speech by processing the vocal cord signal, are illustrated. The mobile device 510 is a device that can perform a predetermined communication in a mobile environment, such as, a personal digital assistant (PDA) and a cellular phone.

The input unit 500 receives the vocal cord signal through a vocal cord microphone 202, and transmits the vocal cord signal that is input via a wireless transmitter 204 to the mobile device 510. The structures and functions of the vocal cord microphone 202 and the wireless transmitter 204 are the same as those described with reference to FIG. 4.

The mobile device 510 is composed of a wireless receiver 206, a noise remover 210, a feature extracting unit 220, a recognizing unit 230, and a database 240. The mobile device 510 receives the vocal cord signal output from the input unit 500 through the wireless receiver 206, and then recognizes the vocal cord signal via the noise remover 210, the feature extracting unit 220, and the recognizing unit 230. The structures and functions of the noise remover 210, the feature extracting unit 220, the recognizing unit 230, and the database 240 are the same as those described with reference to FIG. 4, and thus their descriptions will be omitted.

FIG. 6 is a flow chart illustrating a method of vocal-cord signal recognition according to an embodiment of the present invention.

Referring to FIG. 6, a vocal cord signal is received through the neck microphone (S600). Channel noise is removed from the received vocal cord signal (S610). After removing of the channel noise, a feature vector is extracted from the vocal cord signal (S620). Then, vocal-cord signal is recognized by similarity between the feature vector and the learned database 240.

According to the present invention, provided is a method of feature extraction that can accurately recognize commands of a user even in a noisy environment through a method of extracting features from a vocal cord signal. Thus, the user's command can be precisely recognized in a noisy car or when in a mobile state.

In addition, since little calculations is required to remove noise, the present invention is applicable in real-time in a small-sized mobile device which has limited resources. Furthermore, the present invention provides more convenience since the vocal cord signal is transmitted through a wireless channel.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for vocal-cord signal recognition, comprising:
    a signal processing unit which receives a vocal cord signal and digitalizes the vocal cord signal;
    a noise removing unit which removes channel noise included in the vocal cord signal, the noise removing unit to calculate an average cepstrum of a predetermined mute section of the vocal cord signal, and to subtract the average cepstrum from a cepstrum of each frame of the vocal cord signal;
    a feature extracting unit which extracts a feature vector from the vocal cord signal, which has the channel noise removed therefrom; and
    a recognizing unit which calculates a similarity between the vocal cord signal and a learned model parameter.

2. The apparatus of claim 1, wherein the signal processing unit calculates a threshold for re-adjusting a gain appropriate for an end point detection of the vocal cord signal in a wireless receiver, which receives the vocal cord signal through a wireless personal area network, and transmits the calculated threshold to a wireless transmitter to re-adjust a gain of an amplifier.

3. The apparatus of claim 1, wherein the noise removing unit uses $\hat{X}_t = X_t - N_{new}$, which subtracts local moving average noise cepstrum renewed by $N_{new} = \alpha \times N_{old} + (1-\alpha) \times N_c$ from cepstrum of each frame,
    wherein α is a weight, $N_c$ is a noise cepstrum of a first time period, $N_{old}$ is a noise cepstrum of a second time period preceding the first time period, and $X_t$ and $\hat{X}_t$ is a cepstrum of an original signal of a current frame and a cepstrum with noise removed, respectively.

4. The apparatus of claim 1, wherein the feature extracting unit detects a signal section of the vocal cord signal using a method of end point detection through dispersion of magnitude in a frequency domain, and extracts a feature vector from the vocal cord signal of a detected signal section.

5. The apparatus of claim 3, wherein the feature extracting unit extracts a real-time feature vector from a voice section, a start point and an end point of which are determined by $(S_t \geq \text{BaseThreshold})$ and $(\text{abs}(S_t - N_t) \geq \text{RelativeThreshold})$ and $(S_t \leq \text{BaseThreshold})$ and $(\text{ContinuousNoiseFrames} \geq \text{NoiseDuration})$, respectively, wherein, $$S_t = \frac{1}{N_1} \sum_{i=t-N_1}^{t} X_i, \; N_t = \frac{1}{N_2} \sum_{i=t-N_1-N_2}^{t-N_1} X_i$$

$X_i$ is a spectrum distribution when t=i, BaseThreshold is a minimum limit value of the vocal cord signal, RelativeThreshold is a threshold for comparing a relative difference between $S_t$ and $N_t$, and NoiseDuration is a value for determining the end point of the vocal cord signal.

6. The apparatus of claim 1, wherein the signal processing unit comprises:
    a vocal cord microphone which receives and digitalizes the vocal cord signal;
    a wireless transmitter which transmits the vocal cord signal through wireless communication; and
    a wireless receiver which receives the vocal cord signal output from the wireless transmitter.

7. A method of speech recognition, comprising:
    receives a vocal cord signal through a neck microphone;
    removing channel noise included in the vocal cord signal by calculating an average cepstrum of a predetermined mute section of the vocal cord signal and subtracting the average cepstrum from a cepstrum of each frame of the vocal cord signal;
    extracting a feature vector from the vocal cord signal, which has the channel noise removed therefrom; and
    recognizing speech by calculating similarity between the vocal cord signal and a learned model parameter.

8. The method of claim 7, wherein the extracting of the feature vector from the vocal cord signal comprises:
    detecting a signal section of the vocal cord signal using a method of end point detection dispersion of magnitude in a frequency domain; and
    extracting a feature-vector from the vocal cord signal of the detected signal section.

* * * * *